United States Patent
Seto et al.

(10) Patent No.: US 7,099,764 B2
(45) Date of Patent: Aug. 29, 2006

(54) BRAKING CONTROL DEVICE

(75) Inventors: Yoji Seto, Yokosuka (JP); Minoru Tamura, Yokohama (JP); Yoshinori Yamamura, Yokohama (JP); Seiki Takahashi, Yokosuka (JP); Masahide Nakamura, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 354 days.

(21) Appl. No.: 10/726,498

(22) Filed: Dec. 4, 2003

(65) Prior Publication Data
US 2004/0145238 A1    Jul. 29, 2004

(30) Foreign Application Priority Data
Jan. 24, 2003    (JP)    ............... 2003-016184

(51) Int. Cl.
*B60T 8/32* (2006.01)
(52) U.S. Cl. ............... 701/70; 701/301; 342/455; 340/436; 340/903; 303/193
(58) Field of Classification Search ............... 701/70, 701/96, 301; 342/455; 340/436, 903; 303/121, 303/193
See application file for complete search history.

(56) References Cited

U.S. PATENT DOCUMENTS

| | | | | |
|---|---|---|---|---|
| 5,540,298 A | * | 7/1996 | Yoshioka et al. ............... 180/169 |
| 6,021,375 A | * | 2/2000 | Urai et al. ............... 701/301 |
| 6,084,508 A | * | 7/2000 | Mai et al. ............... 340/463 |
| 6,359,553 B1 | * | 3/2002 | Kopischke ............... 340/436 |
| 6,604,042 B1 | * | 8/2003 | Maruko et al. ............... 701/96 |
| 6,842,684 B1 | * | 1/2005 | Kade et al. ............... 701/70 |
| 6,873,286 B1 | * | 3/2005 | Albero et al. ............... 342/71 |
| 2003/0067219 A1 | | 4/2003 | Seto et al. | |
| 2004/0193351 A1 | * | 9/2004 | Takahashi et al. ............... 701/70 |
| 2004/0236491 A1 | * | 11/2004 | Seto ............... 701/96 |

FOREIGN PATENT DOCUMENTS

| JP | 06-298022 A | 10/1994 |
|---|---|---|
| JP | 2003-112618 A | 4/2003 |
| JP | 2003-182544 A | 7/2003 |

* cited by examiner

*Primary Examiner*—Gary Chin
(74) *Attorney, Agent, or Firm*—Shinjyu Global IP Counselors

(57) ABSTRACT

A braking control device performs a steering and/or avoidance possibility determination based on the state of the vehicle to execute automatic vehicle braking when an obstacle in front of the vehicle cannot be avoided by steering and/or braking. The device determines that the obstacle can be avoided by steering when the correlation value between steering avoidance time and relative velocity is smaller than the distance from the vehicle to the obstacle. The steering avoidance time is set to a shorter value when the suspension characteristic is stiffer and the sideways force generated by the front wheels is larger. The steering avoidance time is set successively shorter for low, high, and medium speed travel regions, respectively, to reflect the behavior response characteristic of the vehicle with respect to steering input. The vehicle deceleration that would occur if the driver released the accelerator pedal is considered in the braking avoidance possibility determination.

28 Claims, 7 Drawing Sheets

BRAKING CONTROL DEVICE

BACKGROUND OF THE INVENTION

1. Field of the Invention

The present invention relates to a braking control device that executes automatic braking when it is not possible for the vehicle in which the braking control device is installed to avoid an object located in front of the vehicle by steering or braking.

2. Background Information

There are many existing braking control devices (e.g., Japanese Laid-Open Patent Publication No. 6-298022) that react to, for example, an obstacle located in front of the vehicle by calculating the distance required to avoid the obstacle by braking and the distance required to avoid the obstacle by steering and executing automatic braking when the actual distance between the vehicle and the obstacle is smaller than either of the calculated distances. Thus, unnecessary execution of automatic braking is prevented when the driver intends to avoid the obstacle by steering.

In view of the above, it will be apparent to those skilled in the art from this disclosure that there exists a need for an improved braking control device. This invention addresses this need in the art as well as other needs, which will become apparent to those skilled in the art from this disclosure.

SUMMARY OF THE INVENTION

It has been discovered that in cases where the suspension characteristic can be changed by the driver, the behavior response characteristic of the vehicle with respect to steering and the ability of the vehicle to avoid an obstacle by steering may change when the suspension characteristic is changed.

When the force generated against the front wheels in the steering avoidance direction changes during avoidance of an obstacle by steering changes, again, the behavior response characteristic of the vehicle with respect to steering and the ability of the vehicle to avoid the obstacle by steering may change due to the change in the steering avoidance direction force. Moreover, the ability of the vehicle to avoid an obstacle by braking also may change due to differences in deceleration caused by things other than braking, such as the engine operating state, the traveling speed, and the gear ratio (reduction ratio). The ability to avoid an obstacle by steering also may change due to such factors as the behavior response characteristic of the vehicle with respect to steering being slow when the vehicle is traveling slowly and the steering input of the driver being slow when the vehicle is traveling quickly.

The present invention was developed in view of these problems. One object of the present invention is to provide a braking control device that accurately determines if a vehicle can avoid an obstacle by steering and/or braking and thus enables appropriate execution of automatic braking.

This aspect of the invention can basically be attained by providing a braking control device comprising a forward object detecting section, an avoidance possibility determining section, an automatic braking section and a vehicle behavior response characteristic determining section. The forward object detecting section is configured to detect an object in front of a vehicle in which the braking control device is installed. The avoidance possibility determining section is configured to determine if the object detected in the front of the vehicle by the forward object detecting section can be avoided by at least one of steering and braking. The automatic braking section is configured to execute automatic braking when the avoidance possibility determining section determines that the object cannot be avoided by at least one of steering and braking. The vehicle behavior response characteristic determining section is configured to determine a vehicle behavior response characteristic that includes at least one of a suspension characteristic of the vehicle based on a suspension characteristic setting, a steering avoidance direction force that will be generated in the steering avoidance direction should the object detected in the front of the vehicle by the forward object detecting section be avoided by steering, a change in a vehicle condition that results in deceleration of the vehicle, and a vehicle-object relationship between a traveling speed of the vehicle and a distance the object and the vehicle that is corrected using a non-linear traveling speed based correction coefficient. The avoidance possibility determining section is further configured to set a method by which the object that is determined to be in the front of the vehicle can be avoided by at least one of steering and braking based on the vehicle behavior response characteristic determined by the vehicle behavior response characteristic determining section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
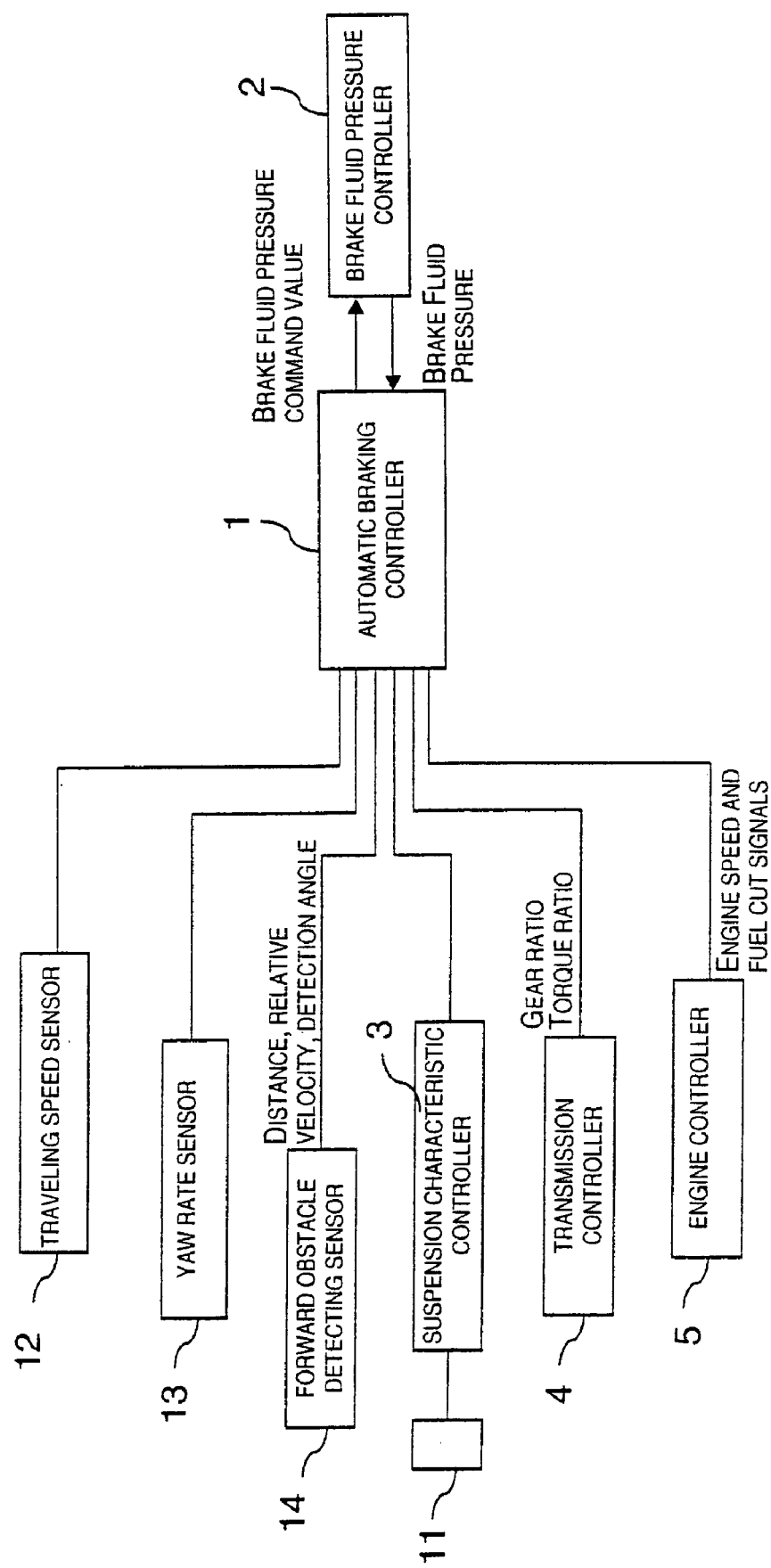
FIG. 1 is a block diagram illustrating a braking control device in accordance with one preferred embodiment of the present invention.

Referring initially to FIG. 1, a block diagram illustrates a braking control device in accordance with one preferred embodiment of the present invention. The vehicle in this embodiment is assumed to be a rear wheel drive vehicle. Although the present invention can be adapted to a front wheel drive vehicle or an all-wheel drive vehicle. Basically, the braking control device includes an automatic braking controller 1, a brake fluid pressure controller 2, a suspension characteristic controller 3, a transmission controller 4 and an engine controller 5. The suspension characteristic controller 3 includes a suspension characteristic setting switch 11, which is discussed later. Also the braking control device preferably includes a plurality of sensors including, but not limited to a traveling speed sensor 12, a yaw rate sensor 13, and a forward obstacle detecting sensor 14.

The automatic braking controller 1 of the present invention is configured and arranged to execute automatic braking when it is not possible for the vehicle in which the braking control device is installed to avoid an object located in front of the vehicle by steering or braking. In order to achieve this, the braking control device of the present invention sets a method by which it will determine if an object in front of the vehicle can be avoided by steering based on at least one of a suspension characteristic, steering avoidance direction force, and traveling speed of the vehicle. The braking control device of the present invention also sets the method by which it will determine if an object in front of the vehicle can be avoided by braking based on the deceleration that occurs when the accelerator pedal is released. By taking these factors into account, the braking control device can accurately determine if an object in front of the vehicle can be avoided by steering and, thus, can execute automatic braking appropriately.

The automatic braking controller 1 preferably includes a microcomputer or other computing device with an automatic braking control program that controls the brake fluid pressure controller 2 as discussed below. In other words, the automatic braking controller 1 uses the signals from the sensors 12–14 and the other controllers 2–5 to calculate a brake fluid pressure command value, which it outputs to the brake fluid pressure controller 2 as discussed later. The automatic braking controller 1 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The automatic braking controller 1 is operatively coupled to the other controllers 2–5 and the sensors 12–14 in a conventional manner. The internal RAM of the automatic braking controller 1 stores statuses of operational flags and various control data. The internal ROM of the automatic braking controller 1 stores various operational programs and the like. It will be apparent to those skilled in the art from this disclosure that the precise structure and algorithms for automatic braking controller 1 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The other controllers 2–5, similarly to the automatic braking controller 1, preferably each includes a microcomputer or other computing device with appropriate control programs as discussed below.

The brake fluid pressure controller 2 is configured and arranged to control the brake fluid pressure of the brake cylinder for each wheel separately and is provided with a brake fluid pressure unit of the type used with conventional anti-skid brake devices and drive force control devices. When the brake fluid pressure controller 2 receives a brake fluid pressure command value from the automatic braking controller 1 (as described later), the brake fluid pressure controller 2 controls the brake fluid pressure supplied to the braking control cylinder of each wheel so as to achieve the brake fluid pressure command value and sends the brake fluid pressure it monitors to the automatic braking controller 1.

The engine controller 5 is configured and arranged to control the operating state of the engine. The engine controller 5 sends signals indicative of the rotational engine speed and fuel cut of the engine to the automatic braking controller 1.

The transmission controller 4 is configured and arranged to control the operating state of the automatic transmission by controlling such factors as the gear ratio (reduction ratio) of the automatic transmission and the lockup clutch of the torque converter. The transmission controller 4 also sends signals indicative of the gear ratio of the automatic transmission and the torque ratio of the torque converter to the automatic braking controller 1.

The suspension characteristic controller 3 is configured and arranged to control the suspension characteristic established by a suspension characteristic adjusting mechanism (not shown) that is configured and arranged to adjust, for example, a spring constant or a damping constant. Accordingly, the suspension characteristic controller 3 constitutes a suspension characteristic setting device that is configured to control the suspension characteristic established by the suspension characteristic adjusting mechanism. The suspension characteristic controller 3 is configured to drive the suspension characteristic adjusting mechanism in accordance with the suspension characteristic setting switch 11 that is operated by the driver and toggles between a suspension characteristic having a large spring constant or damping constant (hereinafter also called "hard suspension characteristic") and a suspension characteristic having a small spring constant or damping constant (hereinafter also called "soft suspension characteristic"). The hard suspension characteristic corresponds to a large spring constant or damping constant, i.e., a stiff lower structure, and is characterized by large and rapid load movement in response to steering and braking. Conversely, the soft suspension characteristic corresponds to a small spring constant or damping constant, i.e., a flexible lower structure, and is characterized by small and slow load movement in response to steering and braking. The suspension characteristic controller 3 informs the automatic braking controller 1 as to which suspension characteristic is set, i.e., the hard characteristic or the soft characteristic.

The forward obstacle detecting sensor 14 constitutes a forward object detecting device that preferably comprises a laser radar controller, CCD camera controller, or the like, that informs the automatic braking controller 1 of the distance between the forward obstacle and the vehicle, the relative velocity between the forward obstacle and the vehicle, and the detection angle of the forward obstacle. In other words, the forward obstacle detecting sensor 14 is configured and arranged to detect the distance between the forward obstacle and the vehicle, the relative velocity between the forward obstacle and the vehicle, and the detection angle of the forward obstacle.

The traveling speed sensor 12 is configured and arranged to detect the traveling speed of the vehicle, while the yaw rate sensor 13 is configured and arranged to detect the yaw rate of the vehicle. The traveling speed sensor 12 and the yaw rate sensor 13 are further configured and arranged to deliver their respective detection values to the automatic braking controller 1.

Next, the processing executed by the automatic braking controller 1 will be explained using FIG. 2. This processing is executed at a prescribed sampling time $\Delta T$, e.g., every 10 milliseconds. The processing shown in FIG. 2 does not illustrate a specific step especially for communication, but required information is exchanged as needed with other controllers 2–5 or memory devices and information obtained from the processing is also exchanged as needed with other controllers 2–5 or memory devices at the appropriate times.

Figure 3:
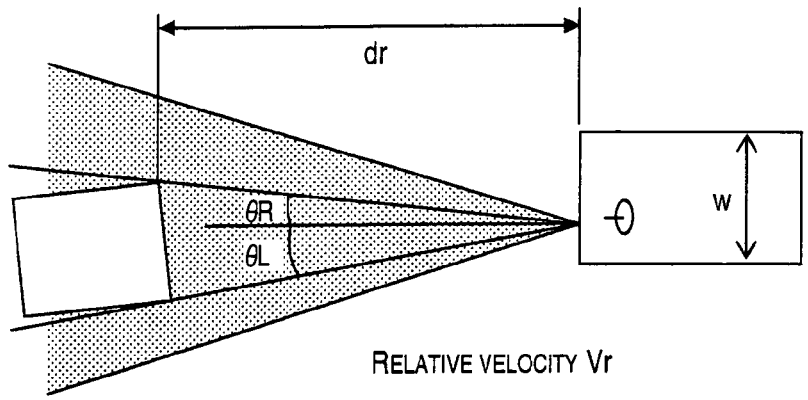
FIG. 3 illustrates a forward obstacle being detected by the forward obstacle detecting sensor of the braking control device that is diagrammatically illustrated in FIG. 1 in accordance with the present invention.

In step S1 of the processing, the automatic braking controller 1 reads information from the forward obstacle detecting sensor 14 which detects the positional relationship between the vehicle and the obstacle or object in front of the vehicle. More specifically, as shown in FIG. 3, the forward obstacle detecting sensor 14 detects the distance dr between the vehicle and the obstacle, the relative velocity Vr between the vehicle and the obstacle, and the detection angles $\theta R$ and $\theta L$ of the obstacle. The obstacle detection angles $\theta R$ and $\theta L$ are the angles made by the right edge and left edge of the obstacle with respect to the forward obstacle detecting sensor 14.

Figure 4:
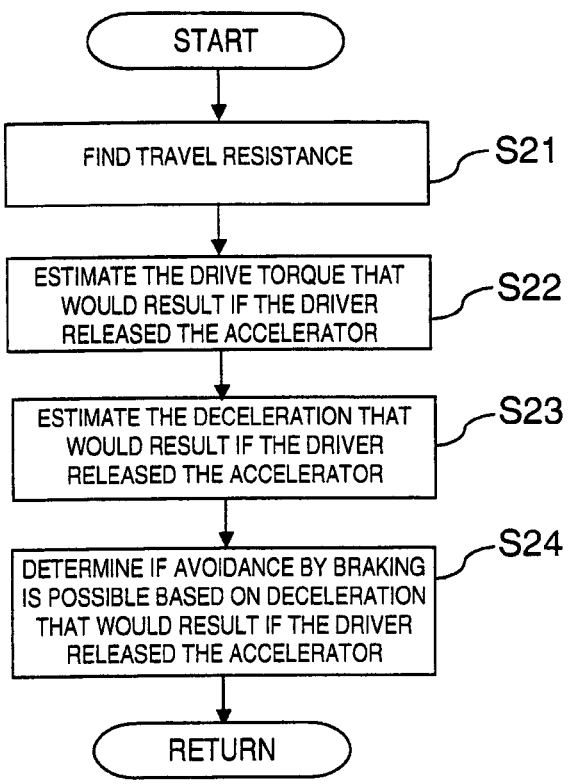
FIG. 4 is a flowchart showing the content of a subroutine executed during the processing sequence executed by the automatic braking controller shown in FIG. 2 in accordance with the present invention.

In step S2, the automatic braking controller 1 executes the processing shown in FIG. 4 (discussed later) to determine if the forward object can be avoided by braking.

Figure 7:
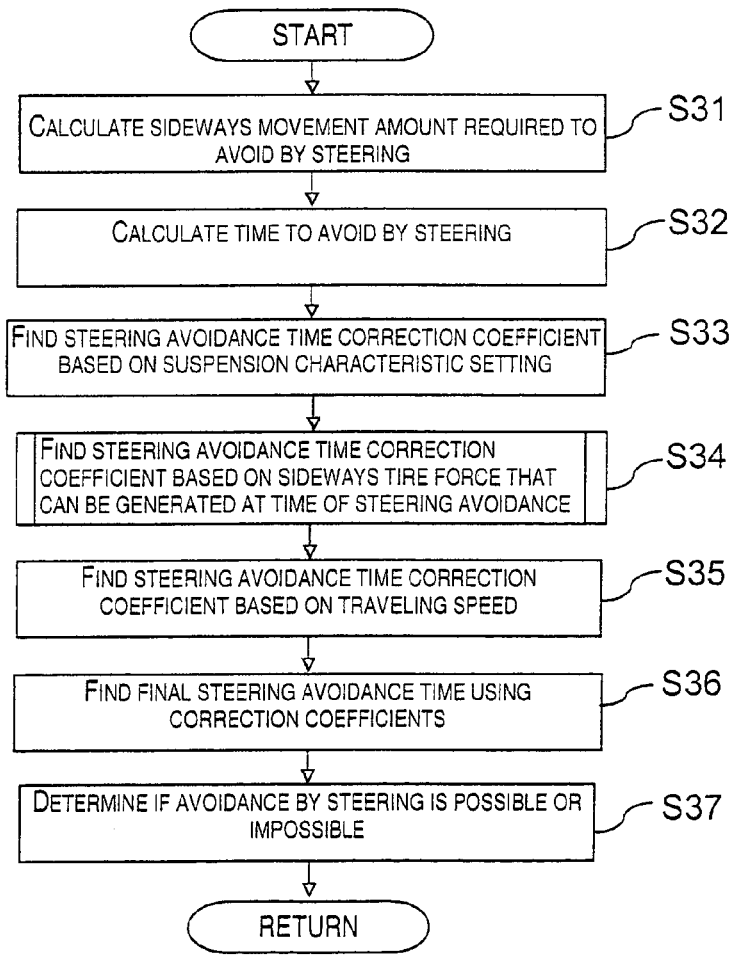
FIG. 7 is a flowchart showing the content of a subroutine executed during the processing sequence executed by the automatic braking controller shown in FIG. 2 in accordance with the present invention.

In step S3, the automatic braking controller 1 executes the processing shown in FIG. 7 (discussed later) to determine if the forward object can be avoided by steering.

In step S4, the automatic braking controller 1 determines if avoidance of the obstacle by braking was determined to be impossible in step S2 and if avoidance of the obstacle by steering was determined to be impossible in step S3. If avoidance by both braking and steering were determined to be impossible, then the automatic braking controller 1 proceeds to step S5. Otherwise, it proceeds to step S6.

In step S5, the automatic braking controller 1 executes automatic braking such that a prescribed braking force based on the positional relationship between the obstacle and the vehicle is produced and returns to the beginning of the main program. More specifically, the automatic braking controller 1 calculates the deceleration required to avoid colliding with the obstacle based on the distance between the obstacle and the vehicle and the relative velocity between the obstacle and the vehicle, calculates the braking force required to achieve the calculated deceleration, calculates the brake fluid pressure required to produce the calculated braking force, and sends a brake fluid pressure command value corresponding to the calculated brake fluid pressure to the brake fluid pressure controller 2.

Meanwhile, in step S6, the automatic braking controller 1 cancels the automatic braking just described and returns to the main program.

Next, the processing executed by the automatic braking controller 1 in step S2 of FIG. 2, i.e., the processing shown in FIG. 4, will be explained.

Figure 5:
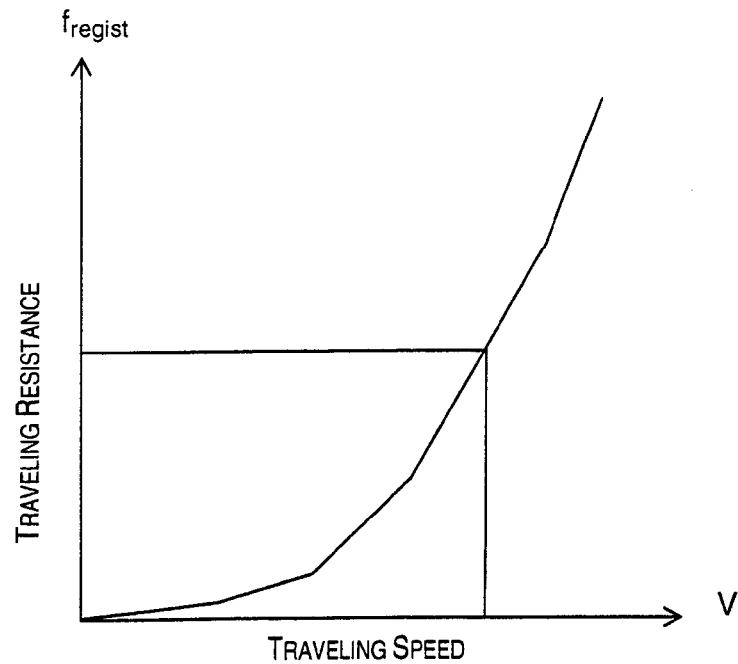
FIG. 5 is a control map used by the subroutine executed during the processing sequence executed by the automatic braking controller shown in FIG. 4 in accordance with the present invention.

In step S21, the automatic braking controller 1 finds the travel resistance of the vehicle. More specifically, for example, since the travel resistance is proportional to the square of the traveling speed, the automatic braking controller 1 uses the control map shown in FIG. 5 to calculate/set the travel resistance $f_{regist}$ based on the traveling speed V detected by the traveling speed sensor 12.

Figure 6:
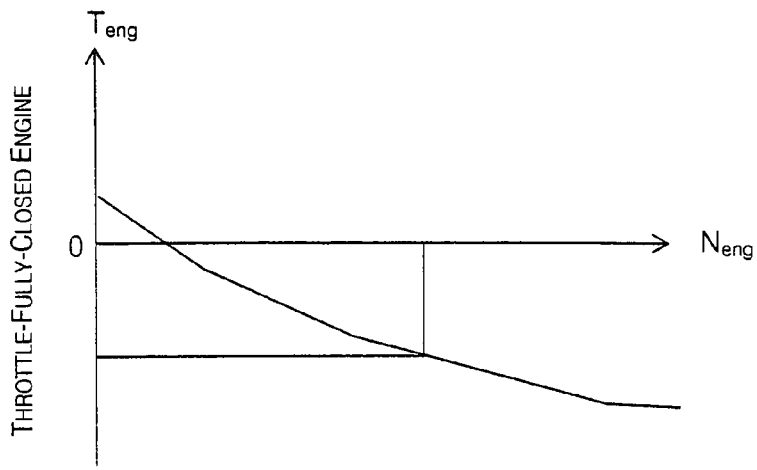
FIG. 6 is a control map used by the subroutine executed during the processing sequence executed by the automatic braking controller shown in FIG. 4 in accordance with the present invention.

In step S22, the automatic braking controller 1 calculates the drive torque (engine braking torque) that occurs when the driver releases the accelerator pedal. More specifically, as shown in FIG. 6 for example, the engine torque $T_{eng}$ that occurs when the throttle is fully closed is determined by the engine speed $N_{eng}$. Thus, the closed-throttle engine torque $T_{eng}$ is found using this control map and the engine braking torque $T_{wheel}$ is calculated by multiplying the closed throttle engine torque by the following ratios inputted from the transmission controller 4: the torque ratio $\eta trq$ of the torque converter, the gear ratio (reduction ratio) $\eta gp$, the final reduction ratio $\eta f$ determined based on the vehicle specifications, and the drive train gear ratio efficiency $\eta eff$. Although in this embodiment the gear ratio is determined by the selected gear position because the vehicle uses a standard step-shifting type automatic transmission, the gear ratio should be found based on the ratio of the input and output rotational speeds of the transmission when a continuously variable transmission is used (unless the transmission has a build-in final gear).

In step S23, the automatic braking controller 1 calculates the vehicle deceleration that will occur when the driver releases the accelerator pedal. More specifically, it adds the negative value of the travel resistance $f_{regist}$ calculated/set in step S21 to the value obtained by dividing the engine braking torque $T_{wheel}$ calculated in step S22 by the rolling radius $r_{wheel}$ of the tire. The result is then divided by the vehicle mass M to obtain the vehicle deceleration $\alpha$ that will occur when the accelerator pedal is released.

Figure 2:
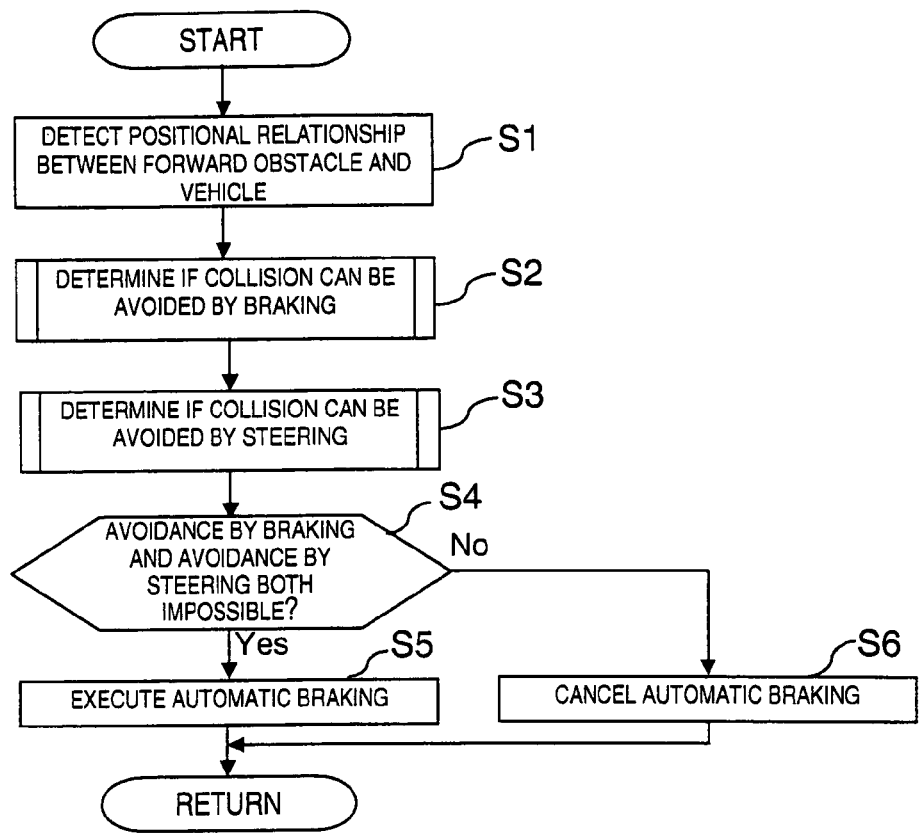
FIG. 2 is a flowchart showing a flow of the processing sequence executed by the automatic braking controller of the braking control device illustrated in FIG. 1 in accordance with the present invention.

In the step S24, the automatic braking controller 1 determines if the obstacle can be avoided by braking based on the vehicle deceleration $\alpha$ calculated in step S23 and proceeds to step S3 of FIG. 2. More specifically, using the distance dr (i.e., distance between vehicle and obstacle) detected by the forward obstacle detecting sensor 14, the relative distance Vr, and the vehicle deceleration $\alpha$, the automatic braking controller 1 determines that the obstacle can be avoided by braking if Equation (1) is satisfied and that the obstacle cannot be avoided by braking if the Equation (1) is not satisfied.

$$dr > (\alpha td - 2vr\ td)/2 - [Vr - (\alpha_{brk} + \alpha)td]^2/2(\alpha_{brk} + \alpha) \quad (1)$$

In the Equation (1), the term $\alpha_{brk}$ (<0) is the acceleration/deceleration amount estimated to occur due to the driver's braking operation during the time, i.e., lag time td, from when the accelerator pedal is released until the vehicle deceleration $\alpha$ is reached.

Next, the processing executed by the automatic braking controller 1 in step S3 of FIG. 2, i.e., the processing shown in FIG. 7, will be explained.

Figure 8:
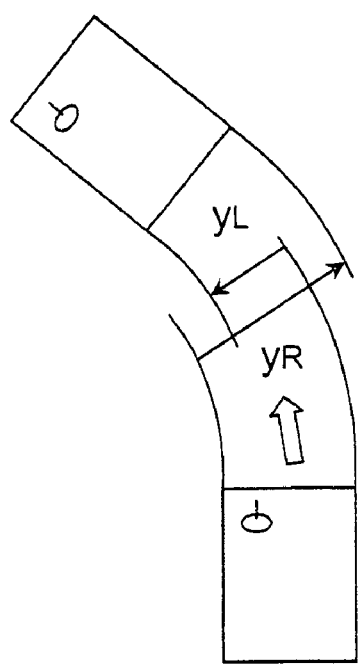
FIG. 8 illustrates the effect of the processing sequence executed by the automatic braking controller shown in FIG. 7 in accordance with the present invention.

In step S31, the automatic braking controller 1 calculates the amount of sideways movement required to avoid the obstacle by steering. More specifically, when the positional relationship between the vehicle and the obstacle is, for example, as shown in FIG. 8, the sideways movement amount $y_R$ required to avoid the obstacle by moving to the right and the sideways movement amount $y_L$ required to avoid the obstacle by moving to the left are calculated using Equations (2) and (3) below.

$$y_R = dr \tan \theta_R - dr \tan [\tfrac{1}{2} \sin^{-1}(\psi'/V)] + w/2 + w_s \quad (2)$$

$$y_L = dr \tan \theta_L + dr \tan [\tfrac{1}{2} \sin^{-1}(\psi'/V)] + w/2 - w_s \quad (3)$$

In the Equations (2) and (3), the term w is the width of the vehicle, the term $w_s$ is the amount by which the forward obstacle detecting sensor 14 is offset from the center of the vehicle, the term $\psi'$ is the yaw rate detected by the yaw rate sensor 13, the term V is the traveling speed detected by the traveling speed sensor 12, the term dr is the distance (between the vehicle and the obstacle) detected by the forward obstacle detecting sensor 14, and the terms $\theta R$ and $\theta L$ are the obstacle detection angles.

The smaller of the sideways movement amount $y_R$ required to avoid the obstacle by moving to the right and the sideways movement amount $y_L$ required to avoid the obstacle by moving to the left is calculated as the sideways movement amount y required to avoid the obstacle by steering.

Figure 9:
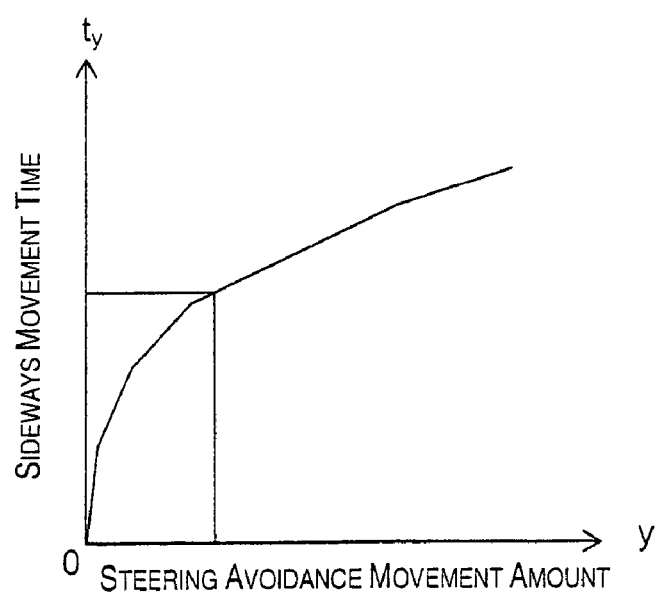
FIG. 9 is a control map used during the processing of FIG. 7 in accordance with the present invention.

In step S32, the automatic braking controller 1 calculates and sets the time required to avoid the obstacle by steering. More specifically, the steering avoidance time (sideways movement time) ty required to avoid the obstacle by steering is calculated and set by using the control map shown in FIG. 9, which plots the relationship between the steering avoidance movement amount y and the sideways movement time ty.

In step S33, the automatic braking controller 1 calculates a correction or compensation coefficient $C_{SUS}$ for the steering avoidance time based on the suspension characteristic setting. In this embodiment, a hard or a soft suspension characteristic can be selected as described previously. In general, the behavior response characteristic of the vehicle with respect to steering is faster when the suspension characteristic is stiff and slower when the suspension characteristic is flexible. Thus, when the hard suspension characteristic is selected, the value of the correction coefficient $C_{SUS}$ is smaller than when the soft suspension characteristic is selected and the steering avoidance time ty is adjusted to a smaller value that is well-suited to the behavior response characteristic of the vehicle.

Figure 11:
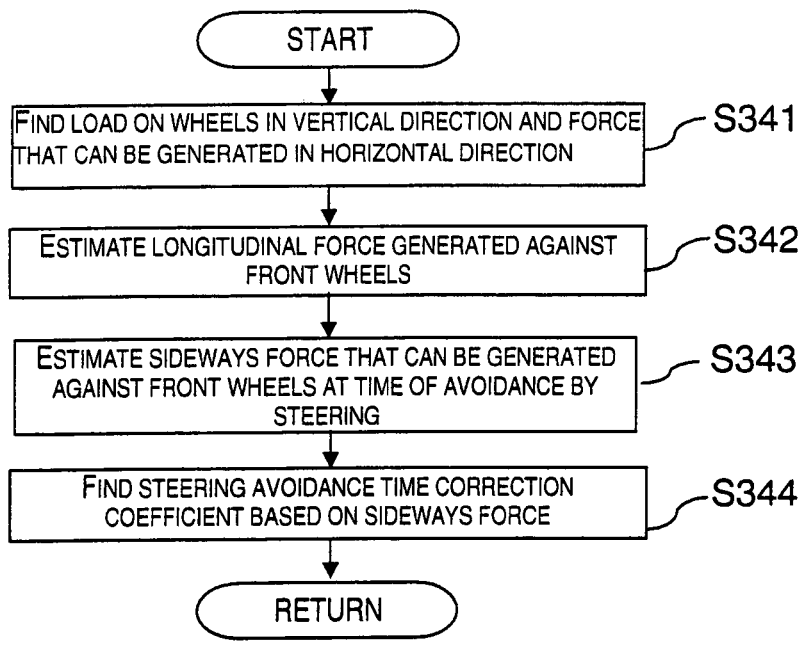
FIG. 11 is a flowchart showing the content of a subroutine executed during the processing sequence executed by the automatic braking controller shown in FIG. 7 in accordance with the present invention.

In step S34, the automatic braking controller 1 executes the processing shown in FIG. 11 (described later) to set a correction or compensation coefficient $C_{Fy}$ for the steering avoidance time based on the sideways tire force that can be generated during steering avoidance, i.e., the force generated against the wheels (particularly the front wheels) in the steering avoidance direction.

Figure 10:
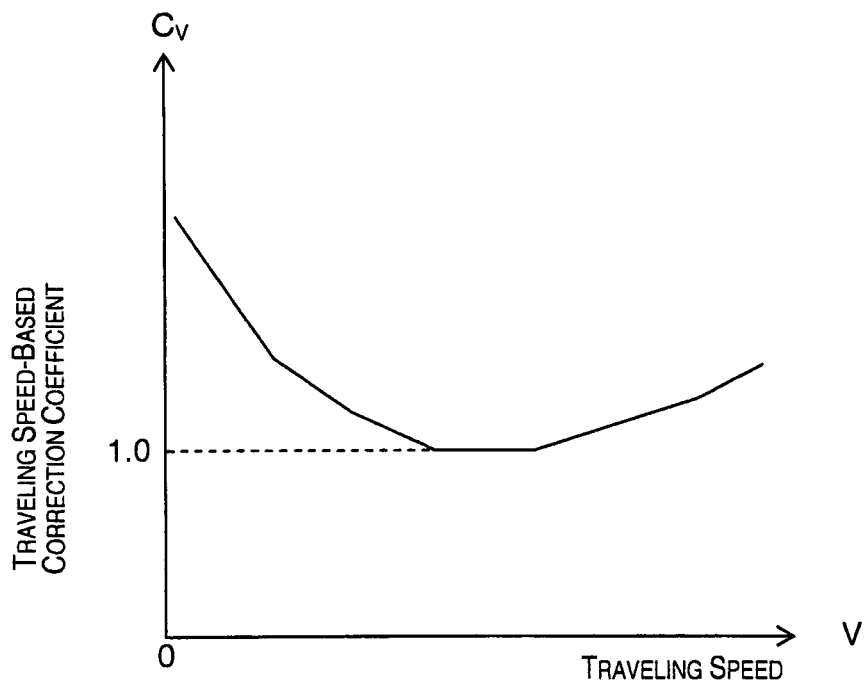
FIG. 10 is a control map used by the subroutine executed during the processing sequence executed by the automatic braking controller shown in FIG. 7 in accordance with the present invention.

In step S35, the automatic braking controller 1 sets a correction coefficient $C_v$ for the steering avoidance time based on the traveling speed v detected by the traveling speed sensor 12. In general, the behavior response characteristic of the vehicle with respect to steering is slower at low traveling speeds and the steering input of the driver is slower at high traveling speeds. Thus, relatively speaking, the behavior response characteristic of the vehicle with respect to steering is fastest when the vehicle is traveling at medium speeds. If one compares the behavior response characteristic of the vehicle with respect to steering at low traveling speeds and the behavior response characteristic of the vehicle resulting from the steering input characteristic of the driver at high traveling speeds, one will find that the behavior response characteristic of the vehicle with respect to steering input at high traveling speeds is slightly faster. Therefore, in accordance with a control map like the one shown in FIG. 10, for example, the correction coefficient $C_v$ set to a larger value in the low traveling speed region than in the medium traveling speed region and the high traveling speed region. The correction coefficient $C_v$ is set to a smaller value in the medium traveling speed region than in the low traveling speed region and the high traveling speed region. Also in the high traveling speed region, the correction coefficient $C_v$ is set to a smaller value than in the low traveling speed region and a larger value than in the medium traveling speed region. Thus, since the steering avoidance time is a threshold value for determining if the obstacle can be avoided by steering (more specifically, the time is multiplied by the relative speed and converted into a distance), the steering avoidance time corrected by being multiplied by the traveling speed-based correction coefficient $C_v$. That is, the threshold value for determining if the obstacle can be avoided by steering, is adjusted to be larger in the low traveling speed region than in the medium traveling speed region and the high traveling speed region, adjusted to be smaller in the medium traveling speed region than in the low traveling speed region and the high traveling speed region, adjusted to be smaller in the high traveling speed region than in the low traveling speed region, and adjusted to be larger in the high traveling speed region than in the medium traveling speed region.

In step S36, the new corrected steering avoidance time ty is calculated by multiplying the steering avoidance time ty calculated in step S32 by suspension characteristic-based correction coefficient $C_{SUS}$ set in step S33, the sideways force (steering avoidance direction force)-based correction coefficient $C_{Fy}$ set in step S34, and the traveling speed-based correction coefficient $C_v$ set in step S35.

In step S37, the automatic braking controller 1 determines if the obstacle can be avoided by steering and then proceeds to step S4 of FIG. 2. More specifically, the automatic braking controller 1 determines that the obstacle can be avoided by steering if the value obtained by multiplying the new steering avoidance time ty calculated in step S36 by the relative velocity $V_r$ (between the vehicle and the obstacle) detected by the forward obstacle detecting sensor 14 is smaller than the distance dr (between the vehicle and the obstacle) also detected by the forward obstacle detecting sensor 14. Otherwise, it determines that the obstacle cannot be avoided by steering.

Next, the processing executed by the automatic braking controller 1 in step S34 of FIG. 7, i.e., the processing shown in FIG. 11, will be explained.

In step S341, the automatic braking controller 1 calculates the vertical load on the front wheels and the force that can be generated in the horizontal direction based on the vertical load. In other words, it calculates the friction force that can be generated in the horizontal direction by multiplying the vertical drag on the front wheels by road surface friction coefficient. More specifically, the automatic braking controller 1 calculates the vehicle acceleration/deceleration $\alpha x$ based on a time differential value of the traveling speed v detected by the traveling speed sensor 12, calculates the front wheel load Nf using the vehicle acceleration/deceleration αx in Equation (4) shown below, and calculates the maximum horizontal force Fmax that can be generated by multiplying the front wheel load Nf by the road surface friction coefficient μ.

$$Nf=(Lr\ g\ M)/(Lf+Lr)-(h\ M)/(Lf+Lr)\alpha x \qquad (4)$$

In the Equation (4), the term Lf is the horizontal distance from the center of gravity of the vehicle to the front wheel axle, the term Lr is the horizontal distance from the center of gravity of the vehicle to the rear wheel axle, h is the vertical distance from the center of gravity of the vehicle to the wheel axles, and the term g is the acceleration due to gravity. When the road surface friction coefficient μ can be detected, the detected value can be used.

In step S342, the force Fx exerted against the front wheels in the longitudinal direction is calculated. Since the vehicle is assumed to have rear wheel drive in this embodiment, the longitudinal force Fx is calculated by multiplying the front wheel brake fluid pressure Pf monitored by the brake fluid pressure controller 2 by a braking force conversion coefficient kp. When the invention is used with a front wheel drive vehicle or a four wheel drive vehicle, the value obtained by dividing the drive torque acting on the front wheels by the tire rolling radius should be taken into account.

In step S343, the automatic braking controller 1 calculates the sideways force, i.e., the force in the steering avoidance direction, which can be generated during steering avoidance. More specifically, based on the frictional circle theory, the sideways force Fy should be found under the assumption that the sum of the square of the longitudinal force Fx calculated in step S342 and the square of the steering avoidance direction force, i.e., the sideways force Fy, equals the square of the maximum horizontal force Fmax calculated in step S341.

Figure 12:
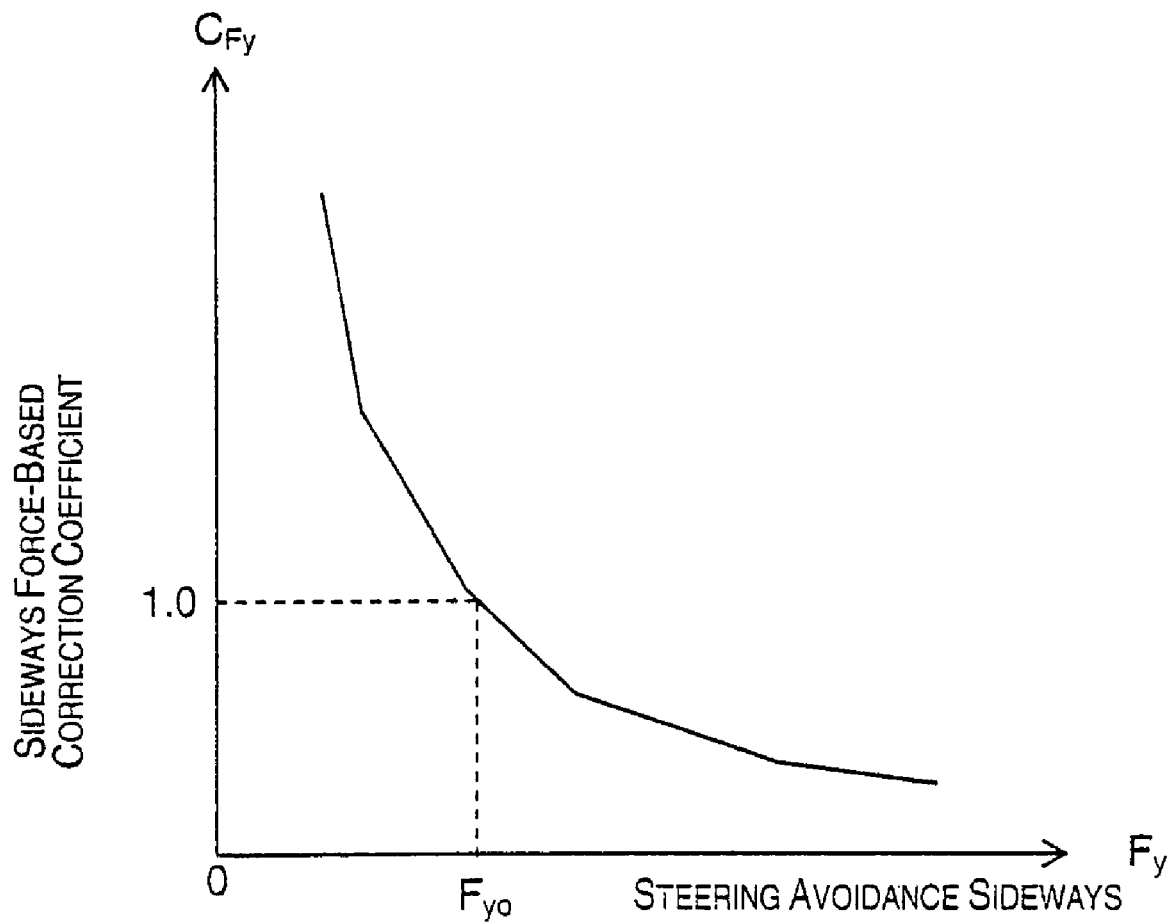
FIG. 12 is a control map used by the subroutine executed during the processing sequence executed by the automatic braking controller shown in FIG. 11 in accordance with the present invention.

In step S344, the automatic braking controller 1 calculates the correction coefficient $C_{Fy}$ for the steering avoidance time based on the sideways force Fy calculated in step S343. More specifically, the larger the sideways force that can be generated during steering avoidance is, the shorter the time required for avoiding the obstacle by steering can be. Therefore, in accordance with the control map shown in FIG. 12, when the sideways force Fy is larger, the sideways force-based correction coefficient $C_{Fy}$ is set to a smaller value and, thus, the steering avoidance time ty, i.e., the threshold value for determining if the obstacle can be avoided by steering, is set to a smaller value.

With the braking control device of the present invention, automatic braking is executed when, based on the positional relationship between the vehicle and the forward obstacle (object detected in front of the vehicle), it is determined that the obstacle cannot be avoided by braking and cannot be avoided by steering.

The braking control device of the present invention determines if the obstacle can be avoided by steering by checking if the correlation value between the steering avoidance time ty and the relative velocity Vr is smaller than the distance dr between the vehicle and the forward obstacle. When the correlation value between the steering avoidance time ty and the relative velocity Vr is smaller than the distance dr between the vehicle and the obstacle, the braking control device determines that the forward obstacle can be avoided by steering.

The steering avoidance time ty is corrected by the suspension characteristic-based correction coefficient $C_{SUS}$ such that the steering avoidance time ty is smaller (shorter) when the suspension characteristic is stiffer. When the suspension characteristic can be changed, as in this embodiment, the time required to avoid an obstacle by steering will be shorter when the suspension characteristic is stiffer. Therefore, by correcting the steering avoidance time ty in accordance with the suspension characteristic as explained previously, the determination as to whether or not an obstacle can be avoided by steering can be performed accurately and the automatic braking can be started at an appropriate timing.

The steering avoidance time ty is also corrected by the sideways force-based correction coefficient $C_{Fy}$ such that the steering avoidance time ty becomes smaller (shorter) when the sideways force Fy, i.e., the steering avoidance direction force, that can be generated is larger. The larger the sideways force Fy that can be generated when avoiding a forward obstacle by steering, the shorter the time required to avoid the object by steering. Therefore, by correcting the steering avoidance time ty in accordance with the sideways force Fy that can be generated as explained previously, the determination as to whether or not an obstacle can be avoided by steering can be performed accurately and the automatic braking can be started at an appropriate timing.

By calculating the steering avoidance direction force, i.e., the sideways force Fy that can be generated, based on the longitudinal force Fx and vertical drag, i.e., load, on the wheels, the sideways force Fy that can be generated can be calculated accurately and the automatic braking can be started at an even more appropriate timing.

The steering avoidance time ty is also corrected with the traveling speed-based correction coefficient $C_{fv}$ such that the steering avoidance time ty is comparatively smaller (shorter) in the low traveling speed region, high traveling speed region, and medium traveling speed region, respectively. This arrangement reflects the manner in which the behavior response characteristic of the vehicle with respect to steering changes in accordance with the traveling speed of the vehicle; the steering avoidance time ty is set to smaller values when the behavior response characteristic of the vehicle with respect to steering is faster. By correcting the steering avoidance time ty in accordance with the traveling speed, the determination as to whether or not an obstacle can be avoided by steering can be performed accurately and the automatic braking can be started at an appropriate timing.

Meanwhile, the determination as to whether or not an obstacle can be avoided by braking is executed based on the vehicle deceleration α at the time of accelerator pedal release using Equation (1). In addition to the acceleration/deceleration $α_{BRK}$ imparted by the braking operation, the deceleration that the vehicle experiences also includes a component caused by the engine braking torque $T_{eng}$. The engine braking torque $T_{eng}$ varies depending on the engine speed $N_{eng}$, the torque ratio ηtrq, and the gear ratio (reduction ratio) ηgp. In this embodiment, these parameters are taken into account when the vehicle deceleration α that will occur when the accelerator pedal is released is calculated and this vehicle deceleration is taken into account when determining if an obstacle can be avoided by braking. Therefore, the determination as to whether or not an obstacle can be avoided by steering can be performed accurately and the automatic braking can be started at an appropriate timing.

In view of the preceding discussion, the forward obstacle detecting sensor 14 of FIG. 1 and the processing of step S1 of FIG. 2 constitute a forward object detecting section or device. Moreover, step S3 of FIG. 2 and the processing of FIGS. 7 and 11 constitute a steering avoidance determining section or device, while the processing of steps S4 and S5 of FIG. 2 constitutes an automatic braking section or device.

The suspension characteristic setting switch 11 and the suspension characteristic controller 3 of FIG. 1 constitute a suspension characteristic setting section or device. The processing of step S34 of FIG. 7 and the processing of steps S341 to S344 of FIG. 11 constitute a steering avoidance direction force calculating section or device. The processing of step S2 of FIG. 2 and the processing of FIG. 4 constitute a braking avoidance determining section or device. The processing of steps S21 to S23 of FIG. 4 constitutes a throttle-fully-closed deceleration calculating section or device. The processing of steps S31 to S36 of FIG. 7 constitutes a steering avoidance threshold value setting section or device. The processing of step S37 of FIG. 7 constitutes a steering avoidance possibility determining section or device. The traveling speed sensor 12 of FIG. 1 constitutes a traveling speed detecting section or device.

Although the disclosed embodiment assumed a rear wheel drive vehicle, the drive mode of the vehicle is not limited to rear wheel drive.

Although the disclosed embodiment was described using a vehicle installed with a standard step-shifting automatic transmission, a continuously variable automatic transmission can also be used.

Although the disclosed embodiment provided two selections of suspension characteristic, hard or soft, it is also acceptable to provide multiple step-like selections or to make the suspension characteristic continuously variable. In such a case, the correction of the steering avoidance time should be designed to reflect the behavior response characteristic of the vehicle in accordance with the suspension characteristic.

Also, although the disclosed embodiment used microcomputers for the controllers, it is also possible to construct the controllers using combinations of counters and electronic circuits, such as comparators.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-16184. The entire disclosure of Japanese Patent Application No. 2003-16184 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A braking control device comprising:
   a forward object detecting section configured to detect an object in front of a vehicle in which the braking control device is installed;
   an avoidance possibility determining section configured to determine if the object detected in the front of the vehicle by the forward object detecting section can be avoided by at least one of steering and braking;
   an automatic braking section configured to execute automatic braking when the avoidance possibility determining section determines that the object cannot be avoided by the at least one of steering and braking; and
   a vehicle behavior response characteristic determining section configured to determine a vehicle behavior response characteristic that includes at least one of a suspension characteristic of the vehicle based on a suspension characteristic setting, a steering avoidance direction force that will be generated in the steering avoidance direction should the object detected in the front of the vehicle by the forward object detecting section be avoided by steering with the steering avoidance direction force being calculated based on a longitudinal force and a load acting on wheels of the vehicle, an accelerator pedal release deceleration that will result should an accelerator pedal be released, and a vehicle-object relationship between the vehicle and the object that is corrected using a non-linear traveling speed based correction coefficient, the avoidance possibility determining section being further configured to set a control operation to determine whether the object that is determined to be in the front of the vehicle can be avoided by the at least one of steering and braking based on the vehicle behavior response characteristic determined by the vehicle behavior response characteristic determining section.

2. The braking control device recited in claim 1, wherein the avoidance possibility determining section includes a steering avoidance determining section configured to determine if the object detected in the front of the vehicle by the forward object detecting section can be avoided by steering.

3. The braking control device recited in claim 2, further comprising
   a suspension characteristic setting section being configured to change the suspension characteristic setting of the vehicle, and
   the steering avoidance determining section further being configured to set the control operation to determine whether the object that is determined to be in the front of the vehicle can be avoided by steering based on the suspension characteristic setting set by the suspension characteristic setting section.

4. The braking control device recited in claim 2, further comprising
   a steering avoidance direction force calculating section being configured to calculate the steering avoidance direction force that will be generated in the steering avoidance direction should the object detected in the front of the vehicle by the forward object detecting section be avoided by steering, and
   the steering avoidance determining section being further configured to set the control operation to determine whether the object that is determined to be in the front of the vehicle can be avoided by steering based on the steering avoidance direction force calculated by the steering avoidance direction force calculating section.

5. The braking control device recited in claim 1, wherein the avoidance possibility determining section includes a braking avoidance determining section configured to determine if the object detected in the front of the vehicle by the forward object detecting section can be avoided by braking.

6. The braking control device recited in claim 5, further comprising
a throttle-fully-closed deceleration calculating section being configured to calculate the accelerator pedal release deceleration that will result should the accelerator pedal be released, and
the braking avoidance determining section being configured to set the control operation to determine whether the object that is determined to be in the front of the vehicle can be avoided by braking based on the accelerator pedal release deceleration calculated by the throttle-fully-closed deceleration calculating section.

7. The braking control device recited in claim 2, wherein the avoidance possibility determining section includes
a steering avoidance threshold value setting section configured to set a variable steering avoidance threshold value for determining if the object detected in front of the vehicle by the forward object detecting section can be avoided by steering based on the vehicle-object relationship between the vehicle and the object that is corrected using the non-linear traveling speed based correction coefficient,
a steering avoidance possibility determining section configured to determine that the object detected in the front of the vehicle by the forward object detecting section cannot be avoided by steering when the vehicle-object relationship between the object and the vehicle matches the variable steering avoidance threshold value set by the steering avoidance threshold setting value setting section, and
a traveling speed detecting section that detects the a traveling speed of the vehicle,
the steering avoidance threshold value setting section being configured to set the steering avoidance threshold value for determining if the object in the front of the vehicle can be avoided by steering based on the traveling speed of the vehicle detected by the traveling speed detecting section.

8. The braking control device recited in claim 7, wherein the steering avoidance threshold value setting section adjusts the variable threshold value for determining if the object can be avoided by steering based on at least one of a time and the a distance between the vehicle and the object, and
the steering avoidance threshold value setting section further adjusts the variable threshold value for determining if the object can be avoided based on the traveling speed of the vehicle as detected by the traveling speed detecting section such that a first threshold value is set when the traveling speed is within a low speed region, a second threshold value is set when the traveling speed is within a medium speed region, and a third threshold value is set when the traveling speed is within a high speed region, with the first threshold value for the low speed region being set larger than the second and third threshold values of the medium speed region and the high speed region, respectively, and the second threshold value for the medium speed region being set smaller than the first and third threshold values of the low speed region and high speed region, respectively.

9. The braking control device recited in claim 7, wherein the steering avoidance determining section is further configured to adjust the variable steering avoidance threshold value based on the suspension characteristic setting set by a suspension characteristic setting section.

10. The braking control device recited in claim 7, wherein the steering avoidance determining section is further configured to adjust the variable steering avoidance threshold value based on the steering avoidance direction force calculated by a steering avoidance direction force calculating section.

11. The braking control device recited in claim 10, wherein
the steering avoidance determining section is further configured to adjust the variable steering avoidance threshold value based on the suspension characteristic setting set by a suspension characteristic setting section.

12. The braking control device recited in claim 11, wherein
the steering avoidance threshold value setting section adjusts the variable threshold value for determining if the object can be avoided by steering based on at least one of a time and a distance between the vehicle and the object, and
the steering avoidance threshold value setting section adjusts the variable threshold value for determining if the object can be avoided based on the traveling speed of the vehicle as detected by the traveling speed detecting section such that a first threshold value is set when the traveling speed is within a low speed region, a second threshold value is set when the traveling speed is within a medium speed region, and a third threshold value is set when the traveling speed is within a high speed region, with the first threshold value for the low speed region being set larger than the second and third threshold values of the medium speed region and the high speed region, respectively, and the second threshold value for the medium speed region being set smaller than the first and third threshold values of the low speed region and high speed region, respectively.

13. The braking control device recited in claim 7, wherein the avoidance possibility determining section includes a braking avoidance determining section configured to determine if the object detected in the front of the vehicle by the forward object detecting section can be avoided by braking.

14. The braking control device recited in claim 13, further comprising
a throttle-fully-closed deceleration calculating section being configured to calculate the accelerator pedal release deceleration that will result should the accelerator pedal be released, and
the braking avoidance determining section being configured to set the control operation to determine whether the object that is determined to be in the front of the vehicle can be avoided by braking based on the accelerator pedal release deceleration calculated by the throttle-fully-closed deceleration calculating section.

15. The braking control device recited in claim 2, further comprising
the avoidance possibility determining section includes a braking avoidance determining section configured to determine if the object detected in the front of the vehicle by the forward object detecting section can be avoided by braking.

16. A braking control device comprising:
forward object detecting means for detecting an object in front of a vehicle in which the braking control device is installed;
avoidance possibility determining means for determining if the object detected in the front of the vehicle by the forward object detecting means can be avoided by the at least one of steering and braking;
automatic braking means for executing automatic braking when the avoidance possibility determining means determines that the object cannot be avoided by the at least one of steering and braking; and
vehicle behavior response characteristic determining means for determining a vehicle behavior response characteristic that includes at least one of a suspension characteristic of the vehicle based on a suspension characteristic setting, a steering avoidance direction force that will be generated in the steering avoidance direction should the object detected in the front of the vehicle by the forward object detecting means be avoided by steering with the steering avoidance direction force being calculated based on a longitudinal force and a load acting on wheels of the vehicle, an accelerator pedal release deceleration that will result should an accelerator pedal be released, and a vehicle-object relationship between the vehicle and the object that is corrected using a non-linear traveling speed based correction coefficient,
the avoidance possibility determining means being further configured to set a control operation for determining whether the object that is determined to be in the front of the vehicle can be avoided by the at least one of steering and braking based on the vehicle behavior response characteristic determined by the vehicle behavior response characteristic determining means.

17. A method of controlling vehicle braking comprising:
detecting an object in front of a vehicle;
determining if the object detected in the front of the vehicle can be avoided by at least one of steering and braking, where an avoidance possibility determination is made based on determining a vehicle behavior response characteristic that includes at least one of a suspension characteristic of the vehicle based on a suspension characteristic setting, a steering avoidance direction force that will be generated in the steering avoidance direction should the object detected in the front of the vehicle by a forward object detecting section be avoided by steering with the steering avoidance direction force being calculated based on a longitudinal force and a load acting on wheels of the vehicle, an accelerator pedal release deceleration that will result should an accelerator pedal be released, and a vehicle-object relationship between the vehicle and the object that is corrected using a non-linear traveling speed based correction coefficient, and;
executing automatic braking upon determining that the object cannot be avoided by the at least one of steering and braking.

18. The method recited in claim 17, wherein the avoidance possibility determination is performed by
detecting the a vehicle traveling speed,
setting a variable steering avoidance threshold value for determining if the object detected in front of the vehicle by the forward object detected in front of the vehicle can be avoided by steering based on the vehicle-object relationship between the vehicle and the object and that is corrected using the non-linear traveling speed based correction coefficient, and
determining that the object detected in the front of the vehicle by the forward object detecting section cannot be avoided by steering when the vehicle-object relationship between the object and the vehicle matches the variable steering avoidance threshold value based on the vehicle traveling speed detected.

19. The method recited in claim 18, wherein the avoidance possibility determination is further performed by
adjusting the variable threshold value for determining if the object can be avoided by steering based on at least one of a time and a distance between the vehicle and the object, and
further adjusting the variable threshold value for determining if the object can be avoided based on the traveling speed of the vehicle such that a first threshold value is set when the traveling speed is within a low speed region, a second threshold value is set when the traveling speed is within a medium speed region, and a third threshold value is set when the traveling speed is within a high speed region, with the first threshold value for the low speed region being set larger than the second and third threshold values of the medium speed region and the high speed region, respectively, and the second threshold value for the medium speed region being set smaller than the first and third threshold values of the low speed region and high speed region, respectively.

20. The method recited in claim 18, wherein further adjusting of the variable steering avoidance threshold value is based on the suspension characteristic setting.

21. The method recited in claim 18, wherein
further adjusting of the variable steering avoidance threshold value is based on the steering avoidance direction force.

22. The method recited in claim 21, wherein
further adjusting of the variable steering avoidance threshold value is based on the suspension characteristic setting.

23. The method recited in claim 18, wherein
the avoidance possibility determination is further performed by determining if the object detected in the front of the vehicle by the forward object detecting section can be avoided by braking.

24. A braking control device comprising:
a forward object detecting section configured to detect an object in front of a vehicle in which the braking control device is installed;
an avoidance possibility determining section configured to determine if the object detected in the front of the vehicle by the forward object detecting section can be avoided by at least one of steering and braking, the avoidance possibility determining section including a steering avoidance determining section configured to determine if the object can be avoided by steering using a variable steering avoidance threshold value calculated based on a vehicle-object relationship between the vehicle and the object with the variable steering avoidance threshold value being adjusted using a non-linear traveling speed based correction coefficient; and
an automatic braking section configured to execute automatic braking when the avoidance possibility determining section determines that the object cannot be avoided by the at least one of steering and braking.

25. The braking control device recited in claim 24, wherein
- the steering avoidance determining section is further configured to adjust the steering avoidance variable threshold value based on a traveling speed of the vehicle such that a first threshold value is set when the traveling speed is within a low speed region, a second threshold value is set when the traveling speed is within a medium speed region, and a third threshold value is set when the traveling speed is within a high speed region, with the first threshold value for the low speed region being set larger than the second and the third threshold values of the medium speed region and the high speed region, respectively, and the second threshold value for the medium speed region being set smaller than the first and third threshold values of the low speed region and high speed region, respectively.

26. The braking control device recited in claim 24, wherein
- the steering avoidance determining section is further configured to adjust the variable steering avoidance threshold value using a suspension characteristic of the vehicle based on a suspension characteristic setting.

27. The braking control device recited in claim 24, wherein
- the steering avoidance determining section is further configured to adjust the variable steering avoidance threshold value using a steering avoidance direction force that will be generated in the steering avoidance direction should the object detected in the front of the vehicle by the forward object detecting section be avoided by steering.

28. The braking control device recited in claim 24, wherein
- the avoidance possibility determining section includes a braking avoidance determining section configured to determine if the object can be avoided by braking based on a change in a vehicle condition that results in deceleration of the vehicle.

* * * * *